United States Patent
Ishihara et al.

(10) Patent No.: US 11,827,773 B2
(45) Date of Patent: Nov. 28, 2023

(54) CURABLE COMPOSITION FOR FIREPROOFING

(71) Applicant: CEMEDINE CO., LTD., Tokyo (JP)

(72) Inventors: Naoko Ishihara, Tokyo (JP); Atsushi Ikeda, Tokyo (JP); Tomonori Saito, Tokyo (JP); Hideharu Hashimukai, Tokyo (JP)

(73) Assignee: CEMEDINE CO., LTD., Tokyo (JP)

( * ) Notice: Subject to any disclaimer, the term of this patent is extended or adjusted under 35 U.S.C. 154(b) by 437 days.

(21) Appl. No.: 16/643,516

(22) PCT Filed: Aug. 31, 2018

(86) PCT No.: PCT/JP2018/032455
§ 371 (c)(1),
(2) Date: Feb. 28, 2020

(87) PCT Pub. No.: WO2019/049797
PCT Pub. Date: Mar. 14, 2019

(65) Prior Publication Data
US 2020/0347233 A1 Nov. 5, 2020

(30) Foreign Application Priority Data
Sep. 5, 2017 (JP) ................... 2017-170029

(51) Int. Cl.
| | |
|---|---|
| *C09K 21/14* | (2006.01) |
| *E04B 1/94* | (2006.01) |
| *C08K 3/04* | (2006.01) |
| *C08L 101/10* | (2006.01) |
| *C08L 63/04* | (2006.01) |
| *C08L 33/06* | (2006.01) |
| *C08K 3/22* | (2006.01) |
| *C08K 3/26* | (2006.01) |
| *C08K 3/32* | (2006.01) |
| *C08K 3/38* | (2006.01) |

(52) U.S. Cl.
CPC .............. *C08L 101/10* (2013.01); *C08K 3/04* (2013.01); *C08L 33/06* (2013.01); *C08L 63/04* (2013.01); *C09K 21/14* (2013.01); *E04B 1/94* (2013.01); *C08K 3/38* (2013.01); *C08K 2003/2227* (2013.01); *C08K 2003/265* (2013.01); *C08K 2003/323* (2013.01); *C08L 2201/02* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 5,852,082 | A * | 12/1998 | Uchida ................. | C08K 5/521 524/127 |
| 6,472,070 | B1 * | 10/2002 | Muraoka ................. | C08K 3/04 252/609 |
| 2006/0099425 | A1* | 5/2006 | Murakami ............... | C08K 3/04 428/413 |
| 2015/0291773 | A1 | 10/2015 | Yoshitake | |
| 2016/0145446 | A1 | 5/2016 | Kittle et al. | |
| 2017/0107374 | A1* | 4/2017 | Harumashi .......... | C08G 65/336 |

FOREIGN PATENT DOCUMENTS

| | | | |
|---|---|---|---|
| CN | 105273360 | * | 1/2016 |
| EP | 814121 | * | 12/1997 |
| JP | 08259794 | * | 10/1996 |
| JP | 2000-143941 A | | 5/2000 |
| JP | 2001-354830 A | | 12/2001 |
| JP | 2001354830 | * | 12/2001 |
| JP | 2006-087819 A | | 4/2006 |
| JP | 2006131749 | * | 5/2006 |
| JP | 2006-348229 A | | 12/2006 |
| JP | 2007146169 | * | 6/2007 |
| JP | 2011-042715 A | | 3/2011 |
| JP | 2016-528336 A | | 9/2016 |
| WO | 2014/057689 A1 | | 4/2014 |
| WO | 2014/162718 A1 | | 10/2014 |

OTHER PUBLICATIONS

International Search Report for International Application No. PCT/JP2018/032455 dated Nov. 13, 2018 (3 sheets, 2 sheets translation, 5 sheets total).
Written Opinion of the International Searching Authority for International Application No. PCT/JP2018/032455 dated Nov. 13, 2018 (10 sheets translation).

* cited by examiner

*Primary Examiner* — David J Buttner
(74) *Attorney, Agent, or Firm* — Kratz, Quintos & Hanson, LLP

(57) ABSTRACT

Provided is a curable composition which forms a cured product that has excellent fireproof performance, while having excellent shape retainability even in cases where the expansion ratio of the cured product after firing is set to a high value. This curable composition includes a shape retention agent, while having fluidity when applied; and if a cured product that is obtained by curing this curable composition is fired in 600° C. air atmosphere for 30 minutes, the cured product after firing has shape retainability.

4 Claims, No Drawings

CURABLE COMPOSITION FOR FIREPROOFING

TECHNICAL FIELD

The present invention relates to a curable composition for fireproofing.

BACKGROUND ART

Constructions such as buildings are required to have functions to prevent spread of fire in case fire occurs inside or outside of the constructions. For this reason, fireproof structures using various fire-prevention materials have been proposed. For example, Patent Document 1 proposes a thermally expandable fireproof material that is used where the thermally expandable fireproof material is injected in a hollow portion of a resin framework having the hollow portion in a longitudinal direction. The thermally expandable fireproof material contains at least (i) a reaction curable resin component, (ii) a thermally expandable component, (iii) a liquid dispersing agent, and (iv) inorganic fillers, and, in the case where a molded material formed from the same resin as the resin framework is immersed in the liquid dispersing agent (iii) at a temperature of 50° C. for 5 days, the change of weights of the molded material before the immersion in the liquid dispersing agent (iii) and after the immersion is less than 1%. According to the thermally expandable fireproof material described in Patent Document 1, a thermally expandable fireproof material exhibiting stable fire prevention properties for a long period of time even in the case where the thermally expandable fireproof material is used in a resin framework can be provided.

CITATION LIST

Patent Literature

Patent Document 1: WO 2014/162718

SUMMARY OF INVENTION

Technical Problem

However, in the case where the expansion ratio exceeds 5, the expanded residue of the thermally expandable fireproof material described in Patent Document 1 exhibits insufficient strength, and it is difficult to maintain the shape after the cured product was fired.

Therefore, an object of the present invention is to provide a curable composition that forms a cured product having an excellent fireproof performance and that has excellent shape retainability even in the case where the expansion ratio after firing of the cured product is set high.

Solution to Problem

To achieve the object described above, the present invention provides a fireproof curable composition including a shape retention agent and having fluidity when applied; in which, when a cured product after curing of the fireproof curable composition is fired in 600° C. air atmosphere for 30 minutes, the cured product after firing has shape retainability.

Furthermore, in the fireproof curable composition, the shape retention agent is preferably at least one compound selected from the group consisting of a novolac-type epoxy resin, a phosphorus compound, a boron compound, and a benzoxazine compound.

Furthermore, the fireproof curable composition preferably includes (A) a (meth)acrylic acid ester polymer containing at least one crosslinkable silicon group in one molecule, and (B) a thermally expandable graphite.

Furthermore, the fireproof curable composition may further include (C) an organic polymer containing at least one crosslinkable silicon group in one molecule, the organic polymer being different from (A) the (meth)acrylic acid ester polymer containing at least one crosslinkable silicon group in one molecule.

Furthermore, to achieve the object described above, the present invention provides a fireproof material having fluidity when applied and including a cured product of a curable composition including a shape retention agent, in which, when the cured product is fired in 600° C. air atmosphere for 30 minutes, the cured product after firing has shape retainability.

Furthermore, in the fireproof material, the shape retention agent is preferably at least one compound selected from the group consisting of a novolac-type epoxy resin, a phosphorus compound, a boron compound, and a benzoxazine compound.

Furthermore, to achieve the object described above, the present invention provides a method of constructing a fireproof structure, the method including: applying a curable composition that has fluidity when applied and includes a shape retention agent onto at least a portion of a surface of a construction; and curing the curable composition to form a cured product; in which, when the cured product is fired in 600° C. air atmosphere for 30 minutes, the cured product after firing has shape retainability.

Furthermore, in the method of constructing a fireproof structure, the shape retention agent is preferably at least one compound selected from the group consisting of a novolac-type epoxy resin, a phosphorus compound, a boron compound, and a benzoxazine compound.

Advantageous Effects of Invention

According to the fireproof curable composition according to an embodiment of the present invention, a fireproof curable composition that forms a cured product exhibiting excellent fireproof performance and shape retainability after curing can be provided.

DESCRIPTION OF EMBODIMENTS

The fireproof curable composition according to an embodiment of the present invention includes a shape retention agent having a function that can contribute to ensure shape retainability after firing a cured product of the curable composition, and has fluidity when applied, and, even when the cured product obtained by curing is fired at a predetermined temperature in air for a predetermined period of time, the cured product after firing maintains its shape. Furthermore, the fireproof curable composition according to an embodiment of the present invention includes (A) a (meth)acrylic acid ester polymer containing at least one crosslinkable silicon group in one molecule, and (B) a thermally expandable graphite.

Furthermore, a cured product of the curable composition according to an embodiment of the present invention obtained by curing may have a predetermined hardness. The hardness of the cured product is Type A Durometer hardness determined in accordance with JIS K 6253-3 of 30 or greater, preferably 40 or greater, and more preferably 50 or greater. By allowing the hardness to be within the range described above, a cured product having excellent compression resistance can be obtained, and stable expansibility can be ensured without limitation on application part of a fireproof structure. The cured product of the curable composition according to an embodiment of the present invention expands when exposed to flame or high temperatures because the cured product includes (B) the thermally expandable graphite; however, even in the case where the expansion ratio is set in a manner that the volume of the cured product after the firing exceeds 5 times the volume of the cured product before the firing, the combustion residue after the expansion is less likely to be broken down, and excellent shape retainability that retains the expanded state is achieved.

That is, for example, even in the case where the combustion residue after firing the cured product in 600° C. air atmosphere for 30 minutes is raised at the rate of 2.0 mm/s, the cured product of the curable composition according to an embodiment of the present invention has shape retainability that allows 50% or greater of the volume of the combustion residue after raised to be remained relative to the volume of the combustion residue before the raise. Note that the volume of the combustion residue after the raise relative to the volume of the combustion residue before the raise is preferably 50% or greater, and more preferably 80% or greater, from the perspectives of preventing or suppressing propagation of flame or heat and exhibiting fireproof performance even in the case where exposure to flame or high temperatures occurs for a longer period of time.

Details of Curable Composition

The curable composition according to an embodiment of the present invention includes a shape retention agent as an essential component. Examples of the shape retention agent include a novolac-type epoxy resin and a shape retention agent other than the novolac-type epoxy resin. The novolac-type epoxy resin is referred to as "(D) novolac-type epoxy resin" or "component (D)". The shape retention agent other than the novolac-type epoxy resin is referred to as "(D') shape retention agent other than the novolac-type epoxy resin" or "component (D')".

Furthermore, it is preferable that (A) the (meth)acrylic acid ester polymer containing at least one crosslinkable silicon group in one molecule (hereinafter, also referred to as "component (A)") and (B) the thermally expandable graphite (hereinafter, also referred to as "component (B)") are mainly included. Furthermore. (C) the organic polymer containing at least one crosslinkable silicon group in one molecule (hereinafter, also referred to as "component (C)"), the organic polymer being different from (A) the (meth)acrylic acid ester polymer containing at least one crosslinkable silicon group in one molecule, is preferably included.

The curable composition according to an embodiment of the present invention has fluidity when applied. The curable composition according to an embodiment of the present invention may be applied in an ordinary temperature environment (e.g., 23° C.) or may be heated to attain viscosity appropriate for applying and then applied; however, from the perspective of simplification of the applying step, the curable composition preferably has fluidity in an ordinary temperature environment. Note that, in an embodiment of the present invention, "having fluidity when applied" refers to physical properties that can be said to have fluidity in general, and from the perspective of applicability, the viscosity at the time of applying to an object to be applied is preferably from 0.1 Pa·s to 3000 Pa·s, more preferably from 1.0 Pa·s to 2000 Pa·s, and particularly preferably from 1.0 Pa·s to 1000 Pa·s. In the case where the curable composition according to an embodiment of the present invention is heated and applied, the heating temperature is not particularly limited, and the heating temperature can be appropriately decided based on the relationship between the applicability and the expansion initiation temperature of (B) the thermally expandable graphite.

(A) (Meth)Acrylic Acid Ester Polymer Containing at Least One Crosslinkable Silicon Group in One Molecule As the component (A), an organic polymer in which the main chain is substantially a (meth)acrylic acid ester polymer and which contains, on average, at least one crosslinkable silicon group in one molecule. The component (A) is a (meth)acrylic acid ester polymer that can contribute to shape retention of a cured product of the curable composition when the cured product is fired.

The crosslinkable silicon group in the component (A) is a group that has a hydroxy group or a hydrolyzable group bonded to a silicon atom, and that can be crosslinked by forming a siloxane bond by moisture, for example, in air. An example of the crosslinkable silicon group includes a group represented by General Formula (1).

[Chemical Formula 1]

(1)

In Formula (1), $R^1$ is a hydrocarbon group having from 1 to 20 carbons, an alkyl group having from 1 to 20 carbons, a cycloalkyl group having from 3 to 20 carbons, an aryl group having from 6 to 20 carbons, an aralkyl group having from 7 to 20 carbons, a triorganosiloxy group represented by $R^1_3SiO$— ($R^1$ is as described above), or —$CH_2OR^1$ group ($R^1$ is as described above). Furthermore, $R^1$ represents a hydrocarbon group having from 1 to 20 carbons in which at least one of hydrogen atoms on the carbon atoms of 1st- to 3rd-position is substituted with a halogen, —$OR^2$, —$NR^3R^4$, —$N=R$, —$SR^6$ ($R^2$, $R^3$, $R^4$, and $R^6$ are each a hydrogen atom or a hydrocarbon group having a substituent having from 1 to 20 carbons or having no substituent, and $R^5$ is a hydrocarbon group having a divalent substituent having from 1 to 20 carbons or having no substituent), a perfluoroalkyl group having from 1 to 20 carbons, or a cyano group. Among these, $R^1$ is preferably a methyl group. When two or more $R^1$ exist, the plurality of $R^1$ may be the same or different. X represents a hydroxy group or a hydrolyzable group, and when two or more X exist, the plurality of X may be the same or different, a is an integer of 0, 1, 2, or 3. Taking curability into consideration, to obtain a curable composition having a sufficient cure rate, a is preferably 2 or greater, and more preferably 3 in Formula (1).

To one silicon atom, from 1 to 3 groups of the hydrolyzable groups and/or hydroxy groups can be bonded. When two or more groups of the hydrolyzable groups and/or hydroxy groups are bonded within the crosslinkable silicon group, these bonded groups may be the same or different. The number of the silicon atoms constituting the crosslinkable silicon group may be one, or two or more; however, in the case of the silicon atoms such as the ones linked by siloxane bonding, the number may be approximately 20.

The hydrolyzable group represented by X is not particularly limited as long as the hydrolyzable group is not an F atom. Such examples include an alkoxy group, an acyloxy group, an amino group, an amide group, an aminooxy group, and an alkenyloxy group. Among these, an alkoxy group is preferable from the perspective of easy handling due to its moderate hydrolyzability. Among alkoxy groups, a group having a smaller number of carbons has higher reactivity, and the one having a greater number of carbons has lower reactivity, in the following order: methoxy group>ethoxy group>propoxy group. Although the alkoxy group can be selected based on the purpose and/or use, a methoxy group and/or ethoxy group is typically used.

Examples of the crosslinkable silicon group include trialkoxysilyl groups, $—Si(OR)_3$, such as a trimethoxysilyl group and triethoxysilyl group, dialkoxysilyl groups, $—SiR^1(OR)_2$, such as a methyldimethoxysilyl group and methyldiethoxysilyl group. Note that R is an alkyl group such as a methyl group or an ethyl group. Furthermore, one kind of crosslinkable silicon group may be used or two or more kinds may be used in combination. The crosslinkable silicon group may be bonded to a main chain or a side chain, or both. When the crosslinkable silicon group is only present at an end of the main chain of the molecular chain, a rubber-like cured product exhibiting a high strength, high elongation, and low elastic modulus tends to be easily obtained because the effective network length of the polymer component included in the cured product that is formed eventually is longer. Furthermore, from the perspectives of excellent physical properties of the cured product, such as tensile properties of the cured product of the curable composition, the crosslinkable silicon group is preferably present at a molecular chain end.

Furthermore, in the component (A), from the perspective of physical properties, such as tensile adhesion after curing and modulus, on average, preferably from 1.0 to 5 groups, and more preferably from 1.1 to 3 groups, of the crosslinkable silicon groups are present in one molecule of the polymer. From the perspective of obtaining a rubber-like cured product exhibiting a high strength, high elongation, and low elastic modulus, on average, preferably 1.0 group or greater, and more preferably from 1.1 to 5 groups, of the crosslinkable silicon groups contained in the component (A) are present in one molecule of the organic polymer. Note that, from the perspective of reducing crosslinking density, an organic polymer having, on average, 1.0 group or less crosslinkable silicon groups in the molecule can be used together.

Specific examples of the main chain backbone of the component (A) include (meth)acrylic acid ester polymers obtained by subjecting a monomer, such as ethyl (meth) acrylate or butyl (meth)acrylate, to radical polymerization. The component (A) may include one kind of these backbones or two or more kinds of these backbones in a form of block or random arrangement.

The (meth)acrylic acid ester polymer has a relatively low glass transition temperature, and the obtained cured product exhibits excellent cold resistance. Furthermore, the (meth) acrylic acid ester polymer exhibits high moisture permeability, and exhibits excellent deep curability when formed into a one-part composition.

As a (meth)acrylic acid ester monomer constituting the main chain of the (meth)acrylic acid ester polymer, various kinds of monomers can be used. Examples include (meth) acrylic acid monomers, such as acrylic acid; alkyl (meth) acrylate monomers, such as methyl (meth)acrylate, ethyl (meth)acrylate, n-butyl (meth)acrylate, 2-ethylhexyl (meth) acrylate, and stearyl (meth)acrylate; alicyclic (meth)acrylate monomers; aromatic (meth)acrylate monomers; (meth)acrylate monomers, such as 2-methoxyethyl (meth)acrylate; silyl group-containing (meth)acrylate monomers, such as γ-(methacryloyloxypropyl)trimethoxysilane and γ-(methacryloyloxypropyl)dimethoxymethylsilane; derivatives of (meth)acrylic acid; and fluorine-containing (meth)acrylate monomers.

For the (meth)acrylic acid ester polymer, vinyl monomers can be copolymerized with (meth)acrylic acid ester monomers. Examples of the vinyl monomers include styrene, maleic acid anhydride, and vinyl acetate. Furthermore, as the monomer unit (hereinafter, also referred to as another monomer unit), acrylic acid and glycidyl acrylate may be included besides these.

These may be used alone, or a plurality of them may be copolymerized. From the perspective of, for example, physical properties of the resulting material, a polymer formed from a (meth)acrylic acid monomer is preferred. Furthermore, a (meth)acrylic acid ester polymer obtained by using one, or two or more of alkyl (meth)acrylate monomers and another (meth)acrylic acid monomer as needed is more preferred. Furthermore, the number of silicon groups in the (meth)acrylic acid ester polymer can be controlled by using a silyl group-containing (meth)acrylic acid ester monomer in combination. From the perspective of achieving excellent adhesive properties, a methacrylate polymer formed from methacrylate monomers is particularly preferable. Furthermore, in the case where viscosity is reduced, flexibility is imparted, or pressure-sensitive adhesion is imparted, appropriate use of an acrylic acid ester monomer is preferred. Note that, in embodiments of the present invention, "(meth) acrylic acid" refers to acrylic acid and/or methacrylic acid.

As the production method of the (meth)acrylic acid ester polymer, a radical polymerization method using a radical polymerization reaction can be used. Examples of the radical polymerization method include a radical polymerization method in which predetermined monomer units are copolymerized using a polymerization initiator (free radical polymerization method), and a controlled radical polymerization method that can introduce a reactive silyl group to a controlled position, such as at an end position. However, polymers obtained by a free radical polymerization method that uses compounds such as an azo-based compound and peroxide as a polymerization initiator typically have a large molecular distribution value of 2 or greater and a high viscosity. Therefore, to obtain a (meth)acrylic acid ester polymer having a narrow molecular weight distribution and a low viscosity and having crosslinkable functional groups at molecular chain ends at a high proportion, use of a controlled radical polymerization method is preferred.

Examples of the controlled radical polymerization method include free-radical polymerization methods and living radical polymerization methods that use a chain transfer agent having a particular functional group. Living radical polymerization methods, such as a reversible addition fragmentation chain transfer (RAFT) polymerization method, a transition metal mediated living radical polymerization method, and an atom transfer radical polymerization (ATRP) method are preferably employed. Note that examples of a reaction to synthesize a polymer having a (meth)acrylic acid ester polymer as a main chain backbone, a part of which is a telechelic polymer (hereinafter, also referred to as "pseudo telechelic polymer") include a reaction that uses a thiol compound having a reactive silyl group; and a reaction that uses a thiol compound having a reactive silyl group and a metallocene compound. The pseudo telechelic polymer obtained by these reactions can be used in a range that does not impair the functions and effects of the curable composition according to an embodiment of the present invention.

In the case where the glass transition temperature (Tg) of the (meth)acrylic acid ester polymer is lower than 0° C., such as the case where the (meth)acrylic acid ester polymer is mainly formed from a butyl acrylate monomer unit, the number average molecular weight of the (meth)acrylic acid ester polymer is preferably 20000 or greater, more preferably 30000 or greater, even more preferably 35000 or greater, and particularly preferably 40000 or greater. Furthermore, in the case where the glass transition temperature (Tg) of the (meth)acrylic acid ester polymer is 0° C. or higher, such as the case where the (meth)acrylic acid ester polymer is mainly formed from a methyl methacrylate monomer unit, the number average molecular weight is preferably from 600 to 10000, more preferably 600 to 5000, and even more preferably from 1000 to 4500. By allowing the number average molecular weight to be within these ranges, in the case where the component (C) is used and a polyoxyalkylene polymer having a crosslinkable silicon group is contained in the component (C), compatibility with this polyoxyalkylene polymer is enhanced. The (meth) acrylic acid ester polymers may be used alone, or two or more kinds of these may be used in combination. Note that the number average molecular weight according to embodiments of the present invention is a molecular weight determined by gel permeation chromatography, calibrated with polystyrene.

(B) Thermally Expandable Graphite (B) The thermally expandable graphite is a lamellar substance in which, for example, an acid is intercalated between the layers of graphite by subjecting the graphite to a treatment using an inorganic acid, such as sulfuric acid or nitric acid, and a strong oxidant, such as concentrated nitric acid, perchloric acid, or hydrogen peroxide. (B) The thermally expandable graphite has properties by which the compound between the layers is gasified by heating and (B) the thermally expandable graphite is expanded by the gasification. Note that, the particle diameter in an embodiment of the present invention is a particle diameter based on "standard sieve" of JIS Z8801-1982 and may be expressed with "μm" as well as "mesh".

The thermally expandable graphite is preferably used after subjected to a neutralization treatment by, for example, ammonia, aliphatic lower amines, alkali metal compounds, or alkaline earth metal compounds.

From the perspectives of making the volume of the cured product after firing larger and densely charging the thermally expandable graphite in the cured product after the firing, it is preferable to blend multiple kinds of thermally expandable graphites having particle diameters that are different from each other. Specifically, it is sufficient in a case where at least two kinds of thermally expandable graphites having particle diameters that are different from each other are used. The absolute value of the difference between a particle diameter of one thermally expandable graphite and a particle diameter of another thermally expandable graphite is preferably 100 μm or greater. Furthermore, in the case where at least two kinds of thermally expandable graphites having particle diameters that are different from each other are used, shape retainability can be enhanced, in a case where, for example, thermally expandable graphite having a smaller particle diameter and thermally expandable graphite having a larger particle diameter are used in combination.

Furthermore, the thermally expandable graphite having the smaller particle diameter may have a particle diameter of less than 100 μm but preferably has a particle diameter of 100 μm or greater, and more preferably has a particle diameter of 150 μm or greater. Furthermore, the thermally expandable graphite having the larger particle diameter preferably has a particle diameter of 200 μm or greater, more preferably 250 μm or greater, and even more preferably 300 μm or greater.

That is, for example, in the case where two kinds of thermally expandable graphites are used, a first thermally expandable graphite, and a second thermally expandable graphite, which has a particle diameter that is different from that of the first thermally expandable graphite, is used. Furthermore, in the case where a thermally expandable graphite having a particle diameter of 150 μm (100 mesh) is used as the first thermally expandable graphite, for example, using a thermally expandable graphite having a particle diameter of 250 μm (60 mesh) or greater as the second thermally expandable graphite is preferred. Similarly, in the case where a thermally expandable graphite having a particle diameter of 300 μm (50 mesh) is used as the first thermally expandable graphite, using a thermally expandable graphite having a particle diameter of 400 μm or greater or 500 μm (30 mesh) or greater as the second thermally expandable graphite is preferred.

Note that, from the perspectives of making the volume of the cured product after firing larger and densely charging the thermally expandable graphite in the cured product after the firing to further enhance blocking performances of flame and/or heat, the thermally expandable graphite having the larger particle diameter preferably has a particle diameter of, at minimum, 300 μm or greater, and the thermally expandable graphite having the smaller particle diameter preferably has a particle diameter of 200 μm or greater.

In the curable composition according to an embodiment of the present invention, the content proportion of (B) the thermally expandable graphite is preferably from 10 parts by mass to 100 parts by mass per 100 parts by mass of the component (A) (in the case where the component (C) is contained, the total amount of the component (A) and the component (C) is 100 parts by mass).

(C) Organic Polymer Containing at Least One Crosslinkable Silicon Group in One Molecule From the perspective of suppressing or eliminating surface tackiness of the cured product, the curable composition may contain the component (C). The component (C) is an organic polymer containing, on average, at least one crosslinkable silicon group in one molecule and the main chain may contain a polysiloxane. Unlike the component (A), in the component (C), the main chain is formed from an organic polymer that is different from the (meth)acrylic acid ester polymer. Note that the crosslinkable silicon group of the component (C) is the same as the crosslinkable silicon group of the component (A), and thus detailed explanation is omitted.

From the perspective of excellent physical properties, such as tensile adhesion after curing and modulus, examples of the main chain of the component (C) include polyoxyalkylene polymers, such as polyoxypropylene, polyoxytetramethylene, and polyoxyethylene-polyoxypropylene copolymers; hydrocarbon polymers, such as ethylene-propylene copolymers, polyisobutylene, polyisoprene, polybutadiene, and hydrogenated polyolefin polymers obtained by subjecting these polyolefin polymers to hydrogenation; polyester polymers obtained by condensation of dibasic acid such as adipic acid, and glycol, or polyester polymers obtained by ring-opening polymerization of lactones; vinyl polymers obtained by subjecting monomers such as vinyl acetate, acrylonitrile, and styrene to radical polymerization; graft polymers obtained by subjecting the vinyl monomers in the organic polymer to polymerization; polysulfide polymers; polyamide polymers; polycarbonate polymers; and diallyl phthalate polymers. These backbones may be contained in the organosiloxane, and may be contained in the component (C) alone, or two or more kinds of these backbones may be contained in a form of block or random arrangement.

Furthermore, saturated hydrocarbon polymers, such as polyisobutylene, hydrogenated polyisoprene, and hydrogenated polybutadiene, and polyoxyalkylene polymers are preferable because the glass transition temperature is relatively low and the obtained cured product exhibits excellent cold resistance. Furthermore, polyoxyalkylene polymers are preferable from the perspectives of exhibiting high moisture permeability and exhibiting excellent deep curability when formed into a one-part composition.

These crosslinkable silicon group-containing organic polymers may be used alone, or two or more kinds of these may be used in combination. Specifically, an organic polymer formed by blending at least two kinds selected from the group consisting of polyoxyalkylene polymers having a crosslinkable silicon group and saturated hydrocarbon polymers having a crosslinkable silicon group can also be used.

The polymer in which the main chain backbone is an oxyalkylene polymer and which has a functional group, such as a hydrolyzable group, at an end (hereinafter, referred to as "polyoxyalkylene polymer") is a polymer having repeating units represented by General Formula (2).

$$—R^7—O— \quad (2)$$

In General Formula (2), $R^7$ represents a straight or branched alkylene group having from 1 to 14 carbons. $R^7$ is preferably a straight or branched alkylene group having from 1 to 14 carbons, and more preferably a straight or branched alkylene group having from 2 to 4 carbons.

Specific examples of the repeating units represented by General Formula (2) include —$CH_2O$—, —$CH_2CH_2O$—, —$CH_2CH(CH_3)O$—, —$CH_2CH(C_2H_5)O$—, —$CH_2C(CH_3)_2O$—, and —$CH_2CH_2CH_2CH_2O$—. The main chain backbone of the polyoxyalkylene polymer may be formed from only one kind of the repeating units or may be formed from two or more kinds of the repeating units. In particular, a main chain backbone formed from a polymer having oxypropylene as a main component is preferred.

The molecular weight of the polyoxyalkylene polymer having a crosslinkable silicon group is preferably a high molecular weight to make a tensile modulus, which is an initial tensile properties of the cured product, small and make elongation at break large. In an embodiment of the present invention, the lower limit of the number average molecular weight of the polyoxyalkylene polymer is preferably 15000, more preferably 18000 or greater, and even more preferably 20000 or greater. Because a higher molecular weight increases the viscosity of the polymer and thus the viscosity of the curable composition also increases, a polymer containing a polymer having a number average molecular weight of 20000 or greater in its part is also preferred. Furthermore, the upper limit of the number average molecular weight is 50000, and preferably 40000. Note that the number average molecular weight according to an embodiment of the present invention is a molecular weight determined by gel permeation chromatography, calibrated with polystyrene. From the perspective of sufficiently ensuring the tensile modulus and elongation at break of the cured product of the curable composition, the number average molecular weight is preferably 15000 or greater. From the perspectives of making the viscosity of the curable composition to an appropriate range and ensuring excellent workability, the number average molecular weight is preferably 50000 or less.

When the content of the crosslinkable silicon group is appropriately reduced in the polyoxyalkylene polymer, the crosslink density in the cured product is reduced, and thus a cured product that is more flexible in early stage is formed, the modulus characteristics become smaller, and the elongation properties at breakage become greater. As to the crosslinkable silicon groups in the polyoxyalkylene polymer, on average, preferably from 1.2 to 2.8, more preferably from 1.3 to 2.6, and even more preferably from 1.4 to 2.4 crosslinkable silicon groups are present in one molecule of the polymer. From the perspective of ensuring sufficient curability, the number of the crosslinkable silicon groups contained in one molecule is preferably 1 or more. From the perspectives of forming a net structure with an appropriate density and ensuring excellent mechanical characteristics, the number of the crosslinkable silicon groups is preferably equal to or less than the predetermined number. Furthermore, in the case of a bifunctional polymer in which the main chain backbone is a straight chain, the number of the crosslinkable silicon groups in the polymer is, on average, preferably 1.2 or greater but less than 1.9, more preferably from 1.25 to 1.8, and even more preferably 1.3 or greater but less than 1.7, in one molecule of the polymer.

The polyoxyalkylene polymer having a crosslinkable silicon group may be straight or branched. From the perspectives of making the tensile modulus small, the polyoxyalkylene polymer having a crosslinkable silicon group is preferably a straight-chain polymer. Furthermore, the molecular weight distribution of the polyoxyalkylene polymer having a crosslinkable silicon group (weight average molecular weight [Mw]/number average molecular weight [Mn]) is 2 or less, and particularly preferably 1.6 or less.

Examples of the synthesis method of the polyoxyalkylene polymer include a polymerization method by an alkali catalyst such as KOH, and a polymerization method by a double metal cyanide complex catalyst; however, the synthesis method is not particularly limited. Using the polymerization method by a double metal cyanide complex catalyst, a polyoxyalkylene polymer having a high molecular weight of a number average molecular weight of 6000 or greater and having a narrow molecular weight distribution of Mw/Mn of 1.6 or less can be obtained.

Other components, such as a urethane bonding component, may be included in the main chain backbone of the polyoxyalkylene polymer. Examples of the urethane bond component include components obtained by reaction of a polyoxyalkylene polymer having a hydroxy group with aromatic polyisocyanate such as toluene (tolylene) diisocyanate and diphenylmethane diisocyanate; or with aliphatic polyisocyanate such as isophorone diisocyanate.

Introduction of the crosslinkable silicon group to the polyoxyalkylene polymer can be performed by reacting a polyoxyalkylene polymer having a functional group, such as an unsaturated group, hydroxy group, epoxy group, or isocyanate group, in the molecule with another functional group that is reactive to such a functional group and a compound having a crosslinkable silicon group (hereinafter, referred to as "polymer reaction method").

Examples of the polymer reaction method include a method, in which hydrosilane having a crosslinkable silicon group or a mercapto compound having a crosslinkable silicon group is allowed to act on an unsaturated group-containing polyoxyalkylene polymer to perform hydrosilylation or mercaptization to obtain a polyoxyalkylene polymer having a crosslinkable silicon group. The unsaturated group-containing polyoxyalkylene polymer can be obtained by reacting an organic polymer having a functional group, such as a hydroxy group, with an organic compound having an active group that exhibits reactivity to such a functional group and an unsaturated group.

Other examples of a polymer reaction method include a method in which a polyoxyalkylene polymer having a hydroxy group at an end, and a compound having an isocyanate group and a crosslinkable silicon group are reacted, and a method in which a polyoxyalkylene polymer having an isocyanate group at a terminal, and a compound having an active hydrogen group, such as a hydroxy group and an amino group, and a crosslinkable silicon group are reacted. By using an isocyanate compound, a polyoxyalkylene polymer having a crosslinkable silicon group can be easily obtained.

The polyoxyalkylene polymers having a crosslinkable silicon group may be used alone, or two or more kinds of these may be used in combination.

In the component (C) of the curable composition according to an embodiment of the present invention, on average, 1 or more crosslinkable silicon groups are preferably present, and 2 or more crosslinkable silicon groups are more preferably present, in one molecule of the organic polymer. Furthermore, from the perspective of suppressing or eliminating surface tackiness of the cured product of the curable composition according to an embodiment of the present invention, the component (C) in the curable composition is contained in an amount that is preferably 0.4 times or greater, and more preferably 1.5 times or greater, relative to the unit part by mass of the component (A).

(D) Novolac-Type Epoxy Resin

From the perspective of enhancing the shape retainability of the cured product, the curable composition preferably contains (D) the novolac-type epoxy resin that is a shape retention agent. That is, (D) the novolac-type epoxy resin has a function that can contribute to ensure the shape retainability after firing of the cured product of the curable composition. Examples of the component (D) include cresol novolac-type epoxy resins and phenol novolac-type epoxy resins.

The molecular weight of (D) the novolac-type epoxy resin is not particularly limited, and the number average molecular weight is preferably from 350 to 1000, and more preferably from 350 to 800. Furthermore, from the perspective of ease in handling, use of (D) a novolac-type epoxy resin that is liquid at ordinary temperature is preferred.

In the curable composition according to an embodiment of the present invention, the compounded proportion of (D) the novolac-type epoxy resin is 0.5 parts by mass or greater, and preferably 1 part by mass or greater, but 50 parts by mass or less, preferably 25 parts by mass or less, and particularly preferably 15 parts by mass or less, relative to 100 parts by mass of the component (A) (in the case where the component (C) is contained, the total amount of the component (A) and the component (C) is 100 parts by mass).

(D') Shape Retention Agent Other than the Novolac-Type Epoxy Resin

From the perspective of enhancing the shape retainability of the cured product, the curable composition preferably contains another shape retention agent other than (D) the novolac-type epoxy resin. Examples of such another shape retention agent other than (D) the novolac-type epoxy resin include phosphorus compounds, boron compounds, and/or benzoxazine compounds. These compounds can be used in place of (D) the novolac-type epoxy resin or can be used together with (D) the novolac-type epoxy resin.

Phosphorus Compound

The phosphorus compound is not particularly limited, and examples of the phosphorus compound include red phosphorus; various kinds of phosphoric esters, such as triphenyl phosphate, tricresyl phosphate, trixylenyl phosphate, cresyl diphenyl phosphate, and xylenyl diphenyl phosphate; metal phosphates, such as sodium phosphate, potassium phosphate, and magnesium phosphate; ammonium polyphosphates; and compounds represented by General Formula (2). Among these, from the perspective of fireproofing, red phosphorus, ammonium polyphosphates, and compounds represented by General Formula (2) are preferred. From the perspectives of, for example, performance, safety, and cost, ammonium polyphosphates are more preferred.

[Chemical Formula 2]

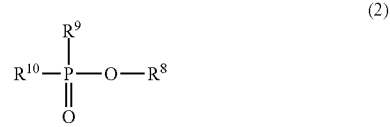

(2)

In the formula, $R^8$ and $R^{10}$ each represent hydrogen, a straight or branched alkyl group having from 1 to 16 carbons, or an aryl group having from 6 to 16 carbons. $R^9$ represents a hydroxy group, a straight or branched alkyl group having from 1 to 16 carbons, a straight or branched alkoxyl group having from 1 to 16 carbons, an aryl group having from 6 to 16 carbons, or aryloxy group having from 6 to 16 carbons.

The red phosphorus can enhance the flame retardance effect of the curable composition by addition of a small amount. As the red phosphorus, a commercially available red phosphorus can be used; however, from the perspectives of moisture resistance and safety, such as no spontaneous ignition occurring upon kneading, for example, use of a compound in which the red phosphorus particle surface is applied with a resin is preferred.

The ammonium polyphosphates are not particularly limited, and examples of the ammonium polyphosphates include ammonium polyphosphate and melamine-modified ammonium polyphosphate. In particular, from the perspectives of, for example, flame retardancy, safety, and cost, ammonium polyphosphate is preferred. Examples of the commercially available products include "AP422" and "AP462" available from Hoechst; "SUMISAFE P" available from Sumitomo Chemical Co., Ltd.; and "TERRAJU C60" available from Chisso Corporation.

The compound represented by General Formula (2) is not particularly limited, and examples of the compound include methylphosphonic acid, dimethyl methylphosphate, diethyl methylphosphate, ethylphosphonic acid, propylphosphonic acid, butylphosphonic acid, 2-methylpropylphosphonic acid, t-butylphosphonic acid, 2,3-dimethyl-butylphosphonic acid, octylphosphonic acid, phenylphosphonic acid, dioctyl phenylphosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, and bis(4-methoxyphenyl)phosphinic acid. Among these, t-butyl phosphonic acid is preferred from the perspective of high flame retardancy.

The phosphorus compounds described above may be used alone, or two or more kinds of these may be used in combination.

Boron Compound

Examples of the boron compound include borax, boron oxide, boric acid, and/or borate.

Examples of the borate include borates of alkali metal, alkaline earth metal, elements of the group 4, the group 12, and the group 13, and ammonium. Specific examples include alkali metal borates, such as lithium borate, sodium borate, potassium borate, and cesium borate; alkaline earth metal borates, such as magnesium borate, calcium borate, and barium borate; zirconium borate; aluminum borate; and ammonium borate.

The boron compounds described above may be used alone, or two or more kinds of these may be used in combination.

Benzoxazine Compound

The resin having a dihydro benzoxazine ring, which is the benzoxazine compound, is described in JP 49-47387 A, for example, and can be synthesized in accordance with Formula (3) below by using a compound having a corresponding phenolic hydroxy group, formalin, and primary amine. This resin undergoes a ring-opening polymerization reaction by heating and forms a crosslink structure having excellent properties without generating volatile portions.

[Chemical Formula 3]

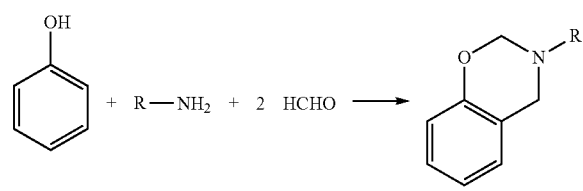

(3)

In Formula (3), R represents an alkyl group, a substituted alkyl group, a cycloalkyl group, an aryl group, or an aralkyl group, for example.

Examples of the compound having a phenolic hydroxy group include bisphenol compounds, biphenol compounds, trisphenol compounds, and tetraphenol compounds. Examples of the phenol resin include phenol resins, such as novolac resins, resol resins, phenol-modified xylene resins, alkylphenol resins, melamine phenol resins, and polybutadiene-modified phenol resins. Examples of the bisphenol compound include bisphenol A, bisphenol S, bisphenol F, and positional isomers of these, and tetrafluoro bisphenol A. Furthermore, in the case where a phenol resin is used, when a heat resistant resin containing a dihydrobenzoxazine ring contains a structural unit represented by General Formula (A) below and a structural unit represented by General Formula (B) below, the molar ratio A/B is from 1/0.25 to 9, and each structural unit is directly in contact or indirectly via an organic group, a cured product having excellent strength and heat resistance can be obtained.

[Chemical Formula 4]

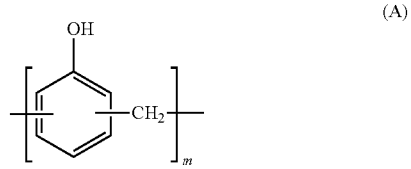

(A)

[Chemical Formula 5]

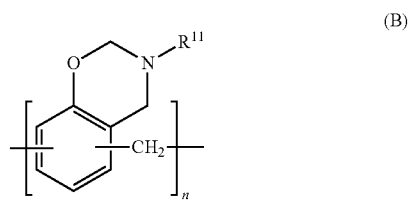

(B)

However, $R^{11}$ is a methyl group, a cyclohexyl group, a phenyl group, or a substituted phenyl group, and hydrogen of an aromatic moiety of the structural units (A) and (B), except the ortho position of the hydroxyl group of the structural unit (A), may be substituted with any substituent. The number of each of the structural units is not particularly limited, and in the case where the number of the structural units (A) contained in one molecule is m and the number of the structural units (B) is n, m and n only have to satisfy $m \geq 1$, $n \geq 1$, and $m+n \geq 2$, and preferably satisfy $10 \geq m+n \geq 3$. Each of the structural units may be directly bonded or may be bonded through an organic group. Examples of the organic group include an alkylene group and a xylylene group. Examples of the alkylene group include along chain alkylene group having 5 or more carbons. Specific examples of the primary amine include methylamine, cyclohexylamine, aniline, and substituted aniline.

Furthermore, examples of a commercially available benzoxazine compound include trade names "P-d type benzoxazine" and "F-a type benzoxazine" available from Shikoku Chemicals Corporation.

In the curable composition according to an embodiment of the present invention, the compounded proportion of a shape retainability-enhancing agent, other than (D') the novolac-type epoxy resin, is preferably 0.5 parts by mass or greater, more preferably 1 part by mass or greater, and particularly preferably 3 parts by mass or greater, but preferably 150 parts by mass or less, more preferably 100 parts by mass or less, and particularly preferably 90 parts by mass or less, relative to 100 parts by mass of the component (A) (in the case where the component (C) is contained, the total amount of the component (A) and the component (C) is 100 parts by mass).

As the shape retention agent, from the perspectives of exhibiting excellent shape retainability by addition of a small amount and achieving excellent adjustment of workability, use of a novolac-type epoxy resin and/or a benzoxazine compound is preferred. Furthermore, from the perspective of ease in handling, use of a novolac-type epoxy resin that is liquid at ordinary temperature is particularly preferred.

Other Compounded Substances

In a range that does not impair the effect of the present invention, the fireproof curable composition according to an embodiment of the present invention may further contain various substances, such as flame retardants, epoxy resins other than the novolac-type epoxy resins, curing agents for epoxy resins, phenol resins, inorganic fillers other than the flame retardants, antiaging agents, moisture absorption materials, adhesion imparting agents, curing catalysts, fillers, diluents, ultraviolet absorbing agents, antioxidants, physical properties-adjusting agents, plasticizers, thixotropic agents, pressure-sensitive adhesion imparting agents, anti-sagging agents, radical polymerization initiators, antifungal agents, colorants, and/or solvents such as toluene and alcohol; and may be blended with other polymers that are compatible.

Flame Retardant

The curable composition according to an embodiment of the present invention may further contain a flame retardant other than (B) the thermally expandable graphite. By the further addition of the flame retardant other than (B) the thermally expandable graphite, expansion ratio after firing of the cured product can be adjusted while excellent fireproof performance of the cured product of the curable composition is maintained.

The flame retardant is not particularly limited and publicly known compounds can be used. For example, as the flame retardant, metal hydroxides such as aluminum hydroxide and magnesium hydroxide, halogen-based flame retardants such as chlorine compounds and bromine compounds, antimony-based flame retardants such as antimony trioxide and antimony pentoxide, and inorganic oxides such as silica fillers can be used. These flame retardants may be used alone, or two or more kinds of these may be used in combination.

Among the flame retardants, from the perspective of generating no noxious gases, aluminum hydroxide and magnesium hydroxide, which are metal hydroxides, are preferred, and aluminum hydroxide is more preferred.

Furthermore, in the case where a flame retardant other than (B) the thermally expandable graphite is blended in the curable composition according to an embodiment of the present invention, the total amount of (B) the thermally expandable graphite and the flame retardant other than (B) the thermally expandable graphite is preferably 30% or greater, and more preferably 40% or greater, relative to the total amount (mass "g") of the curable composition according to an embodiment of the present invention. Note that the total amount is a total amount of the component (A), the component (B), the component (C), and the component (D) or the component (D'), and optionally contained other compounded substances.

By setting the total amount of (B) the thermally expandable graphite and the flame retardant to the compounded amount described above, a curable composition having superior fireproof performance of a cured product can be obtained.

Note that the compounded proportion of (B) the thermally expandable graphite and the flame retardant is not particularly limited. In the case where the expansion ratio after firing is increased for the cured product of the curable composition according to an embodiment of the present invention, the compounded proportion of (B) the thermally expandable graphite only has to be increased.

Epoxy Resin Other than Novolac-Type Epoxy Resin

Various epoxy resins can be used as the epoxy resin other than the novolac-type epoxy resin. Examples of epoxy resins other than the novolac-type epoxy resin include bisphenol A epoxy resins, bisphenol F epoxy resins, bisphenol AD epoxy resins, bisphenol S epoxy resins, hydrogenated epoxy resins of these, glycidyl ester epoxy resins, glycidyl amine epoxy resins, alicyclic epoxy resins, aliphatic epoxy resins, urethane-modified epoxy resins containing a urethane bond, fluorinated epoxy resins, rubber-modified epoxy resins (e.g. epoxy resins that are modified with a rubber selected from the group consisting of polybutadienes, styrene-butadiene rubbers (SBR), nitrile rubbers (NBR), and CTBN), and flame-retardant epoxy resins such as glycidyl ether of tetrabromo bisphenol A. These epoxy resins may be used alone, or two or more kinds of these may be used in combination. By allowing the epoxy resin other than the novolac-type epoxy resin to be contained, adhesion to an adherend can be enhanced.

Among these epoxy resins, from the perspective of balance of workability, curability, adhesive strength, adherend versatility, water resistance, and durability, bisphenol A epoxy resins, bisphenol F epoxy resins, bisphenol AD epoxy resins, bisphenol S epoxy resins, and hydrogenated epoxy resins of these can be used, and bisphenol A epoxy resins and bisphenol F epoxy resins are preferred, and bisphenol A epoxy resins are more preferred. Note that, in the case where the curable composition contains other epoxy resins other than the component (D), such blending is possible in a range that does not impair the effect of the curable composition according to an embodiment of the present invention.

In the case where the curable composition according to an embodiment of the present invention contains an epoxy resin other than the component (D), the compounded proportion of the epoxy resin other than the component (D) is 0.01 parts by mass or greater, and preferably 3 parts by mass or greater, but 100 parts by mass or less, and preferably 50 parts by mass or less, relative to 100 parts by mass of the component (A) (in the case where the component (C) is contained, the total amount of the component (A) and the component (C) is 100 parts by mass).

Curing Agent for Epoxy Resin

The curable composition according to an embodiment of the present invention may contain a curing agent for an epoxy resin. Furthermore, as the curing agent, for example, one or multiple kind(s) of epoxy resin curing agents can be selected and used. Examples of such a curing agent include primary amines, such as alicyclic amines, aliphatic amines including aromatic rings, aromatic amines, and modified amines; secondary amines, such as straight secondary amines; acid anhydrides, such as aromatic acid anhydrides, cyclic aliphatic acid anhydrides, and aliphatic acid anhydrides; other curing agents, such as polyamide resins, organic acid hydrazides, synthetic resin initial condensates, and polyvinylphenols; and compounds having an amino group that has undergone ketimination.

Phenol Resin

The curable composition according to an embodiment of the present invention may contain a phenol resin. As the phenol resin, various phenol resins, such as novolac-type phenol resins and resol-type phenol resins, can be used. From the perspective of antipollution measures for indoor air quality, as the phenol resin, for example, use of a novolac-type phenol resin that can prevent generation of formaldehyde is preferred. The phenol resin can contribute to shape retention of residue after firing the cured product of the curable composition.

In the case where the curable composition according to an embodiment of the present invention contains a phenol resin, the compounded proportion of the phenol resin is 0.01 parts by mass or greater, and preferably 3 parts by mass or greater, but 20 parts by mass or less, and preferably 10 parts by mass or less, relative to 100 parts by mass of the component (A) (in the case where the component (C) is contained, the total amount of the component (A) and the component (C) is 100 parts by mass).

Inorganic Filler Other than Flame Retardant

As the inorganic fillers other than flame retardant, for example, fumed silica, precipitated silica, silicic anhydride, hydrous silicic acid, carbon black, fine calcium carbonate, heavy calcium carbonate, and calcium carbonate such as surface-treated product of these, alumina, magnesium carbonate, diatomaceous earth, silica sand, pumice powder, slate powder, calcined clay, clay, talc, kaolin, titanium oxide, bentonite, organic bentonite, ferric oxide, zinc oxide, active zinc oxide, glass balloon, shirasu balloon, and inorganic fibers can be used. Furthermore, as the inorganic fillers, surface-treated inorganic fillers obtained by subjecting these compounds to surface treatment by, for example, a silane coupling agent can be used. Furthermore, as the inorganic fillers, a mixture of two or more kinds of inorganic fillers selected from the group consisting of the inorganic fillers described above and the surface-treated inorganic fillers can be also used.

Adhesion Imparting Agent

By allowing the curable composition according to an embodiment of the present invention to contain an adhesion imparting agent, adhesion of the cured product to various adherends, such as metal, plastic, and glass, can be enhanced.

As the adhesion imparting agent, various silane coupling agents, which are alkoxy group-containing silanes, can be used. For example, various silane coupling agents, including amino group-containing silanes, such as 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, and 1,3-diaminoisopropyltrimethoxysilane; ketimine group-containing silanes, such as 3-trimethoxysilyl-N-(1,3-dimethyl-butylidene)propylamine; and mercapto group-containing silanes, such as 3-mercaptopropyltrimethoxysilane, can be used.

The compounded proportion of the adhesion imparting agent is not particularly limited and is preferably 0.2 parts by mass or greater, more preferably 0.3 parts by mass or greater, and even more preferably 0.5 parts by mass or greater, but preferably 20 parts by mass or less, more preferably 15 parts by mass or less, and even more preferably 10 parts by mass or less, relative to 100 parts by mass of the component (A) (in the case where the component (C) is contained, the total amount of the component (A) and the component (C) is 100 parts by mass). These adhesion imparting agents may be used alone, or two or more kinds of these may be used in combination.

Curing Catalyst

As the curing catalyst, for example, organotin compounds, such as reaction products of dibutyltin dilaurate, dibutyltin diacetate, or dioctyltin oxide and a silicate compound, and reaction products of dibutyltin oxide and phthalate; metal carboxylates, such as tin carboxylate, bismuth carboxylate, and iron carboxylate; aliphatic amines, aromatic amines; carboxylic acid, such as versatic acid; alkoxy metals, such as titanium compounds such as diisopropoxy titanium bis(ethylacetoacetate), and aluminum compounds; inorganic acids; boron trifluoride complexes, such as boron trifluoride ethylamine complexes; metal chelate compounds, such as aluminum monoacetylacetonate bis(ethylacetoacetate), can be used. Among these, an organotin compound is preferred.

In the case where a curing catalyst is used, use of 0.5 parts by mass or greater, and preferably 1 part by mass or greater, but 20 parts by mass or less, and preferably 15 parts by mass or less, relative to 100 parts by mass of the component (A) (in the case where the component (C) is contained, the total amount of the component (A) and the component (C) is 100 parts by mass) is preferred.

The curable composition according to an embodiment of the present invention may be one-part or two-part composition, and from the perspective of workability, use as a one-part composition is preferred. Because the curable composition according to an embodiment of the present invention is a moisture-curable type, sufficient fireproof properties can be exhibited by applying and then curing.

The curable composition according to an embodiment of the present invention can be used for use that requires fireproof properties, and for example, can be used as an adhesive agent, a potting material, a coating material, a sealing material, an adhesive material, a paint, a putty material, and/or a primer. Furthermore, the curable composition according to an embodiment of the present invention can be used as a fireproof material or can be used as a fireproof material in which the curable composition according to an embodiment of the present invention is provided in a fireproof component. The curable composition according to an embodiment of the present invention can be applied for, for example, use in constructions such as various buildings, use in automobiles, use in civil engineering, and use in various electrical and electronic fields.

Method of Constructing Fireproof Structure

A fireproof structure can be formed by using the curable composition according to an embodiment of the present invention. That is, the method of constructing a fireproof structure according to an embodiment of the present invention includes: applying the curable composition according to an embodiment of the present invention onto at least a portion of a surface of a construction, and curing the curable composition to form a cured product. As an example, a fireproof structure that can pass V-0 grade in the flame retardance test stipulated in flammability standard UL94 can be formed by combining a sealing material containing the curable composition according to an embodiment of the present invention and a fireproof wall material. Note that the construction according to embodiments of the present invention include a building formed by using a plurality of components; a plurality of components constituting a building; a component used for air conditioners (such as exhaust ducts); a component having an electric line, such as power distribution installation; a component constituting, for example, water and gas pipes; and other objects and components that are required to prevent fire and combustion or that are required to prevent spreading and catching of fire from outside.

The applying step is a step of applying the curable composition according to an embodiment of the present invention to, for example, a part where a first structural member (e.g., a wall member constituting a wall) having fireproof properties and a second structural member, which is combined with the first structural member, are combined. Furthermore, in the case where the structural member has an opening, the curable composition according to an embodiment of the present invention can be also applied inside the opening. After the applying step, by curing the curable composition, a fireproof cured product is formed at a part where the first structural member and the second structural member are combined. Note that the curable composition according to an embodiment of the present invention can be applied and cured in advance in the region where the first structural member and the second structural member are combined. In this case, the first structural member and the second structural member are combined and integrated in a manner that the region provided with the cured product of the first structural member is sandwiched.

Effect of Embodiments

In the fireproof structure of a construction formed by using the curable composition according to the present embodiment is exposed to flame or high temperatures, the cured product of the curable composition forms a carbonized layer or carbide as a heat-insulating layer and expands to maintain a specific shape. Furthermore, in the case where a fireproof structure is formed by using the curable composition according to an embodiment of the present invention, because excellent shape retainability of the cured product is achieved even when the curable composition is designed to exhibit a high expansion ratio, design flexibility of the fireproof structure is enhanced, and a fireproof structure having even higher fireproof performance can be obtained. As a result, for example, a gap between members that constitute a construction or an opening or a hole is blocked by a combustion residue of the cured product, and the condition where flame, heat, smoke, and/or gases generated by combustion are blocked can be maintained. Therefore, the fireproof structure of the construction formed by using the curable composition according to the present embodiment can exhibit excellent fireproof performance and blocking performance of, for example, flame, heat, smoke, and/or gases.

Furthermore, in the present embodiment, the cured product has predetermined hardness and flexibility, the cured product has properties by which deformation is less likely to occur even when a certain degree of force is applied externally. Therefore, even in the case where the construction has protrusions and recesses, the cured product of the curable composition according to the present embodiment provided on this construction can maintain a shape that corresponds to the protrusions and recesses. As a result, the fireproof structure of the construction according to the present embodiment can maintain the fireproof properties for a long period of time.

Furthermore, because the curable composition contains (D) the novolac-type epoxy resin or (D') a phosphorus compound, a boron compound, and/or a benzoxazine compound as the shape retention agent, the shape retainability of the cured product can be enhanced. That is, in the case where (D) the novolac-type epoxy resin or (D') the phosphorus compound, the boron compound, and/or the benzoxazine compound is used, the shape retainability of the cured product can be ensured and enhanced compared to the case where only an epoxy resin other than (D) the novolac-type epoxy resin, such as a bisphenol type epoxy resin, is used.

EXAMPLES

The curable composition and the cured product according to embodiments of the present invention are described in detail below using examples.

Example 1

The fireproof curable composition (hereinafter, referred to as "curable composition for fireproofing") of Example 1 was prepared as described below. First, as shown in Table 1, the component (A), the component (B), the component (C), the component (D), and the other compounded substances were mixed in the amounts listed in Table 1. The mixture was then agitated to prepare the curable composition for fireproofing of Example 1. The properties of the curable composition for fireproofing and the cured product of Example 1 were then evaluated. The results are shown in Table 1. Note that, in Table 1, the unit of the compounded amount of each compounded substance is "g". Furthermore, the details of the compounded substances are as follows.

Component (A)

*1 (Meth)acrylic acid ester polymer A1 containing at least one crosslinkable silicon group in one molecule: product name "ACTFLOW-SE-09" (acrylic polymer having a silyl group terminal end), available from Soken Chemical & Engineering Co., Ltd.

*2 (Meth)acrylic acid ester polymer A2 containing at least one crosslinkable silicon group in one molecule: product name "SA100S" (acrylic polymer having a silyl group terminal end), available from Kaneka Corporation Component (B)

*3 Thermally expandable graphite B1: product name "expandable graphite 9532400A" (large particle diameter: +32 mesh 75% or greater; corresponded to particle diameter of 500 μm), available from Ito Graphite Co., Ltd.

*4 Thermally expandable graphite B2: product name "expandable graphite 9950200" (small particle diameter: +50 mesh 80% or greater; corresponded to particle diameter of 300 μm), available from Ito Graphite Co., Ltd.

Component (C)

*5 Organic polymer containing at least one crosslinkable silicon group in one molecule that was different from the component (A): product name "Silyl EST 280" (silyl-terminated polymer), available from Kaneka Corporation Component (D)

*6 Epoxy resin (novolac type): product name "jER 152" (phenol novolac-type epoxy resin), available from Mitsubishi Chemical Corporation Component (D')

*7 Phosphorus compound: product name "TERRAJU C70" (ammonium polyphosphate), available from Chisso Corporation

*8 Boron compound: boric acid, available from Kenei Yakuhin Co., Ltd.

*9 Benzoxazine compound: product name "p-d type benzoxazine", available from Shikoku Chemicals Corporation Flame Retardant

*10 Aluminum hydroxide: product name "Almorix B350", available from Tomoe Engineering Co., Ltd.

Curing Catalyst

*11 Curing catalyst: product name "NEOSTANN U-700ES" (reaction product of dibutyltin oxide and ethyl orthosilicate), available from Nittoh Chemical Co., Ltd.

*12 Latent curing agent: product name "X12-812H" (reaction product of methyl isobutyl ketone (MIBK) and 3-aminopropyltrimethoxysilane), available from Shin-Etsu Chemical Co., Ltd.

Other Compounded Agents

*13 Epoxy resin other than the component (D): product name "DER 331" (bisphenol A epoxy resin), available from Dow Chemical Japan Ltd.

*14 Silica: hydrophobic fumed silica, product name "RY200S", available from Nippon Aerosil Co., Ltd.

*15 Calcium carbonate: product name "WHITON SB Blue", available from Shiraishi Calcium Kaisha, Ltd.

*16 Calcium carbonate: product name "KALFAIN 200", available from Maruo Calcium Co., Ltd.

TABLE 1

| Component | Compound substances | Examples 1 | 2 | 3 | 4 | 5 | 6 | 7 | 8 | 9 | 10 | 11 | 12 | 13 | 14 | Comparative Example 1 | 2 | 3 | 4 |
|---|---|---|---|---|---|---|---|---|---|---|---|---|---|---|---|---|---|---|---|
| (A) | (Meth)acrylic acid ester polymer A1 containing at least one crosslinkable silicon group in one molecule *1 | 20 | 20 | 20 | 20 | 20 | 30 | 20 | 0 | 20 | 20 | 20 | 20 | 20 | 20 | 20 | 20 | 20 | 20 |
| (A) | (Meth)acrylic acid ester polymer A2 containing at least one crosslinkable silicon group in one molecule *2 | 15 | 15 | 15 | 15 | 15 | 15 | 15 | 15 | 15 | 15 | 15 | 15 | 15 | 15 | 15 | 15 | 15 | 15 |
| (B) | Thermally expandable graphite, B1 *3 | 10 | 10 | 10 | 20 | 30 | 30 | 5 | 10 | 10 | 10 | 10 | 10 | 10 | 10 | 10 | 10 | 10 | 10 |
| (B) | Thermally expandable graphite B2 *4 | 40 | 40 | 40 | 40 | 40 | 40 | 20 | 40 | 40 | 40 | 40 | 40 | 40 | 40 | 40 | 40 | 40 | 85 |
| (C) | Organic polymer containing at least one crosslinkable silicon group in one molecule other than the component (A) *5 | 85 | 85 | 85 | 85 | 85 | 85 | 85 | 85 | 85 | 85 | 85 | 85 | 85 | 85 | 85 | 85 | 85 | 85 |
| (D) | Epoxy resin (novolac type) *6 | 10 | 5 | 10 | 5 | 5 | 5 | 5 | 5 | — | — | — | — | — | — | — | — | — | — |
| (D') | Phosphorus compound *7 | — | — | — | — | — | — | — | — | — | 90 | — | — | — | — | — | — | — | — |
| (D') | Boron compound *8 | — | — | — | — | — | — | — | — | 60 | — | 80 | 5 | 10 | 30 | — | — | — | — |
| (D') | Benzoxazine compound *9 | — | — | — | — | — | — | 115 | — | — | — | — | — | — | — | — | — | — | — |
| Other compounded substances | Flame retardant other than the component (B) *10 | 90 | 90 | 90 | 90 | 90 | 90 | — | 90 | 90 | 90 | 90 | 90 | 90 | 90 | 90 | 90 | 90 | 12 |
| | Curing catalyst *11 | 5 | 5 | 5 | 5 | 5 | 5 | 5 | 5 | 5 | 5 | 5 | 5 | 5 | 5 | 5 | 5 | 5 | 5 |
| | Latent curing agent *12 | 4 | 4 | 4 | 4 | 4 | 4 | 4 | 4 | 4 | 4 | 4 | 4 | 4 | 4 | 4 | 4 | 4 | 4 |
| | Epoxy resin other than the component (D) *13 | 7.5 | 7.5 | — | 7.5 | 7.5 | 7.5 | 7.5 | — | — | — | — | — | — | — | 7.5 | — | 15 | 7.5 |
| | Silica *14 | 12.5 | 12.5 | 12.5 | 12.5 | 12.5 | 12.5 | 12.5 | — | 12.5 | — | — | 12.5 | 12.5 | 12.5 | 12.5 | 12.5 | 12.5 | 12.5 |
| | Calcium carbonate *15 | — | — | — | — | — | — | — | 50 | — | — | — | — | — | — | — | — | — | — |
| | Calcium carbonate *16 | — | — | — | — | — | — | — | 50 | — | — | — | — | — | — | — | — | — | — |
| Evaluation method | Hardness of cured product | 60 | 60 | 60 | 70 | 70 | 70 | 65 | 70 | 65 | 75 | 70 | 65 | 65 | 65 | 60 | 60 | 60 | 45 |
| | Firing time | Excellent | Excellent | Excellent | Excellent | Excellent | Excellent | Excellent | Excellent | Excellent | Excellent | Excellent | Excellent | Excellent | Excellent | Excellent | Excellent | Excellent | Poor |
| | Shape retainability after firing | Good | Good | Excellent | Good | Good | Excellent | Excellent | Good | Excellent | Excellent | Excellent | Good | Good | Good | Poor | Poor | Poor | Poor |
| | Expansion ratio after firing (times) | 25 | 23 | 22 | 24 | 32 | 27 | 9 | 25 | 22 | 22 | 26 | 26 | 20 | 20 | 23 | 24 | 25 | 27 |
| | Tackiness | Good | Good | Good | Good | Good | Good | Good | Good | Good | Good | Good | Good | Good | Good | Good | Good | Good | Good |

The properties of the fireproof curable composition of Example 1 was evaluated as described below.

1) Hardness of Cured Product

The curable composition of Example 1 was cured to obtain a cured product. Specifically, the cured product was obtained by curing the curable composition at 23° C., 50% RH, for 7 days (hereinafter, referred to as "curing condition 1"). The size of the cured product was 200 mm length×200 mm width×3.0 mm thickness. The hardness of the cured product obtained by curing the curable composition of Example 1 under the curing condition 1 was measured by using a type A durometer in accordance with JIS K 6253-3.

2) Firing Time The curable composition of Example 1 was cured under the curing condition 1 to obtain a cured product having a size that was 127 mm length×12.7 mm width×1.5 mm thickness. Then, this cured product was set to a stand equipped with a clamp. In accordance with the B method of 5.24.2 in JIS K 6911, a combustion test was performed by using a Bunsen burner. After the contact with flame and after the burner was separated from the test piece, flaming time was measured.

Excellent: The flaming time was 5 seconds or shorter.

Good: The flaming time was longer than 5 seconds but 10 seconds or shorter.

Poor: The flaming time was longer than 10 seconds.

3) Shape Retainability after Firing

The curable composition of Example 1 was cured under the curing condition 1 to obtain a cured product having a size that was 10 mm length×10 mm width×1.5 mm thickness. The cured product was then placed in an electric furnace (available from Yamato Scientific Co., Ltd.; product number: FO300) and fired in 600° C. air atmosphere for 30 minutes. After the firing, the inside of the electric furnace was maintained at 23° C. and left for 12 hours. Then, the condition of the cured product (hereinafter, referred to as "combustion residue") was visually observed at 23° C. and 50% RH. The confirmed items were shape and volume of the combustion residue. The volume of the combustion residue was calculated by measuring the size (length, width, and thickness) of the combustion residue by using a ruler at 23° C. and 50% RH. Note that, in the case where the combustion residue has protrusions and recesses, the average value of the recessed parts and the protruded parts was used for the measurement result.

The combustion residue was raised by 5.0 cm in the vertical direction at a rate of 2.0 mm/s using fingers. Thereafter, the combustion residue was put down under the same condition as the condition of the raise, the volume after raising the combustion residue was calculated by measuring the size of the combustion residue after the raising by using a ruler. The proportion of the volume of the combustion residue after the raise relative to the volume before the raise was then calculated. Note that the force applied by the fingers to raise the combustion residue was a degree of force by which substantially no deformation of the combustion residue was caused.

The shape retainability was evaluated based on the following criteria.

Excellent: At least 80% of the volume remained.

Good: 50% or greater but less than 80% of the volume remained.

Poor: Less than 50% of the volume remained, or the raising by fingers was not possible.

4) Expansion Ratio after Firing

The curable composition of Example 1 was cured under the curing condition 1 to obtain a cured product having a size that was 10 mm length×10 mm width×1.5 mm thickness. The cured product was then placed in an electric furnace (available from Yamato Scientific Co., Ltd.; product number: FO300) and fired in 600° C. air atmosphere for 30 minutes. After the firing, the inside of the electric furnace was maintained at 23° C. and left for 12 hours. The volume of the combustion residue was then calculated. The volume was calculated by measuring the size (length, width, and thickness) of the combustion residue by using a ruler at 23° C. and 50% RH. Note that, in the case where the combustion residue has protrusions and recesses, the average value of the recessed parts and the protruded parts was used for the measurement result. The expansion ratio (times) after the firing was calculated by dividing the volume of the cured product after the firing (volume of combustion residue) by the volume of the cured product before the firing, as described by the following equation.

$$\text{Expansion ratio after firing (times)} = \text{volume of cured product after firing/volume of cured product before firing}$$

5) Tackiness

For the cured product (size of the cured product: 200 mm length×200 mm width×3.0 mm thickness) obtained by curing the curable composition of Working Example 1 under the curing condition 1, tackiness was checked by touching a surface of the cured product by a finger at 23° C. and 50% RH. The tackiness was evaluated based on the following criteria.

Excellent: The surface was free of tackiness.

Somewhat poor: The surface was slightly tacky.

Poor: The surface was tacky.

Examples 2 to 14 and Comparative Examples 1 to 4

The curable compositions of Examples 2 to 14 and Comparative Examples 1 to 4 were prepared in the same manner as in Working Example 1 except for changing the compounded substances of Working Example 1 to those listed in Table 1. The properties were evaluated in the same manner as in Working Example 1. These results are shown in Table 1.

As is clear from Table 1, it was shown that all the curable compositions of Working Examples achieved both excellent fireproof properties, and excellent shape retainability even in the case where the expansion ratio after firing was designed to be large. Furthermore, it was shown that all the cured products of the curable compositions of Working Examples had appropriate hardness. On the other hand, unlike Working Examples, none of Comparative Examples achieved all of these properties. Furthermore, for example, Comparative Examples had insufficient shape retainability, and Comparative Example 4 had insufficient fireproof properties.

The embodiments and the examples of the present invention have been described above; however, the embodiments and the examples described above do not limit the scope of the present invention. Furthermore, it should be noted that all the combinations of the characteristics described in the embodiments and the examples are not necessarily required for the means to solve the problems of the present invention, and various modifications are possible as long as such modifications do not deviate from the technical ideas of the present invention.

The invention claimed is:

1. A fireproof curable composition comprising:
a novolac-type epoxy resin;
(A) a (meth)acrylic acid ester polymer containing at least one crosslinkable silicon group in one molecule, and
(B) a thermally expandable graphite;
wherein the viscosity of the uncured fireproof curable composition when it is applied to an object is 1.0 Pa·s to 1000 Pa·s; and
wherein, when a cured product after curing of the fireproof curable composition is fired in 600° C. air atmosphere for 30 minutes, the cured product after firing has shape retainability.

2. The fireproof curable composition according to claim 1, further comprising: (C) an organic polymer including at least one crosslinkable silicon group in one molecule, the organic polymer being different from (A) the (meth)acrylic acid ester polymer including at least one crosslinkable silicon group in one molecule.

3. A cured product of the fireproof curable composition described in claim 1.

4. The cured product of claim 3, wherein the cured product is fired in 600° C. air atmosphere for 30 minutes.

* * * * *